(12) United States Patent
Wall, II

(10) Patent No.: US 10,029,745 B2
(45) Date of Patent: Jul. 24, 2018

(54) INFLATABLE PANEL FOR AN AERODYNAMIC FAIRING ASSEMBLY

(71) Applicant: WALL GLOBAL LLC, Franklin, TN (US)

(72) Inventor: Billy Russell Wall, II, Franklin, TN (US)

(73) Assignee: Wall Global, LLC., Franklin, TN (US)

( * ) Notice: Subject to any disclaimer, the term of this patent is extended or adjusted under 35 U.S.C. 154(b) by 31 days.

(21) Appl. No.: 15/385,808

(22) Filed: Dec. 20, 2016

(65) Prior Publication Data

US 2017/0096178 A1    Apr. 6, 2017

Related U.S. Application Data

(63) Continuation-in-part of application No. 15/115,762, filed as application No. PCT/US2015/034737 on Jun. 8, 2015, now Pat. No. 9,873,467.

(60) Provisional application No. 62/009,683, filed on Jun. 9, 2014.

(51) Int. Cl.
    *B60J 9/00*        (2006.01)
    *B62D 35/00*    (2006.01)

(52) U.S. Cl.
    CPC ................. *B62D 35/001* (2013.01)

(58) Field of Classification Search
    CPC . A63B 41/08; A63B 45/02; A63B 2243/0025; A47C 27/081; B60R 21/207; B60R 21/213; B60R 21/231; B62D 35/001; B64D 25/10
    USPC ..................................................... 296/180.1
    See application file for complete search history.

(56) References Cited

U.S. PATENT DOCUMENTS

| 2,269,342 A * | 1/1942 | Johnson | A47C 27/128 156/289 |
| 3,128,480 A * | 4/1964 | Lineback | A47C 27/081 5/706 |
| 3,834,752 A | 9/1974 | Cook | |
| 4,006,932 A | 2/1977 | McDonald | |
| 4,236,745 A | 12/1980 | Davis | |
| 4,274,526 A * | 6/1981 | Sims | A62B 1/20 182/48 |
| 4,435,864 A * | 3/1984 | Callaway | A47C 23/047 5/400 |
| 4,601,508 A | 7/1986 | Kerian | |
| 4,688,851 A | 8/1987 | Moore | |

(Continued)

*Primary Examiner* — Kiran B Patel
(74) *Attorney, Agent, or Firm* — R. Tracy Crump

(57) ABSTRACT

An inflatable panel for use as an inflatable airfoil in aerodynamic fairing assemblies that uses a blower that provides a continuous airflow to the inflated panel to maintain it in the deployed position. The inflatable panel is constructed from sheets of PVC vinyl that are cut, assembled and sewn together. The sewn seams act as an air vent that allow air to bleed from the panel, thereby eliminate the need for a separate air vent to bleed off the continuous airflow from the blower. The inflatable panel includes a blower port with an internal vent end designed to prevent the port from becoming obstructed by the body of the panel collapsing on itself as the panel deflates. The inflatable panel also includes a retraction unit oriented so that the internal cable not only retracts the deflating panel uniformly into the panel housing but also laterally urges the panel slightly in one direction to ensure that the deflating panel does not splay outward creating a road hazard.

7 Claims, 7 Drawing Sheets

(56) References Cited

U.S. PATENT DOCUMENTS

| | | | |
|---|---|---|---|
| 4,702,509 A | 10/1987 | Elliot, Sr. | |
| 4,978,162 A | 12/1990 | Labbe | |
| 5,058,945 A | 10/1991 | Elliot, Sr. et al. | |
| 5,483,709 A * | 1/1996 | Foster | A61G 7/05769 |
| | | | 180/125 |
| 5,553,339 A * | 9/1996 | Thomas | A47C 27/081 |
| | | | 5/413 AM |
| 5,632,055 A * | 5/1997 | Graf | A47C 27/081 |
| | | | 5/706 |
| 6,148,461 A * | 11/2000 | Cook | A61G 7/05769 |
| | | | 5/706 |
| 6,202,239 B1 * | 3/2001 | Ward | A47C 27/082 |
| | | | 5/713 |
| 6,409,252 B1 | 6/2002 | Andrus | |
| 6,643,875 B2 * | 11/2003 | Boso | A47C 27/082 |
| | | | 5/691 |
| 6,651,277 B1 * | 11/2003 | Marson | A47C 27/084 |
| | | | 5/420 |
| 6,886,882 B2 | 5/2005 | Farlow et al. | |
| 6,983,502 B2 * | 1/2006 | Boyd | A47C 27/081 |
| | | | 5/655.3 |
| 6,990,700 B2 * | 1/2006 | Chung | A45B 19/02 |
| | | | 137/565.11 |
| 7,007,329 B2 * | 3/2006 | Metzger | A47C 21/022 |
| | | | 5/691 |
| 7,147,270 B1 | 12/2006 | Andrus et al. | |
| 7,152,264 B2 * | 12/2006 | Boyd | A47C 27/081 |
| | | | 5/706 |
| 7,353,555 B2 * | 4/2008 | Lau | A47C 27/081 |
| | | | 5/706 |
| 7,360,266 B2 * | 4/2008 | Kasatshko | A47C 4/54 |
| | | | 297/452.41 |
| 7,376,995 B2 * | 5/2008 | Davis | A61G 7/1026 |
| | | | 5/710 |
| 7,610,642 B2 * | 11/2009 | Boyd | A47C 27/10 |
| | | | 5/710 |
| 7,712,822 B2 | 5/2010 | Pfaff | |
| 7,866,734 B2 | 1/2011 | Mracek | |
| 8,051,517 B2 * | 11/2011 | Wang | A47C 27/083 |
| | | | 5/706 |
| 8,123,281 B2 | 2/2012 | Perkins et al. | |
| 8,444,210 B2 | 5/2013 | Domo et al. | |
| 8,506,004 B1 | 8/2013 | Vogel et al. | |
| 8,584,287 B2 * | 11/2013 | Hrubant | A47C 27/084 |
| | | | 5/654 |
| 8,622,462 B2 | 1/2014 | Ryan et al. | |
| 9,510,689 B2 * | 12/2016 | Kearse | A47C 27/084 |
| 9,756,955 B2 * | 9/2017 | Alder | A47C 27/081 |
| 9,756,956 B1 * | 9/2017 | Pekkinen | A47C 27/142 |
| 2006/0101743 A1 * | 5/2006 | Nickerson | A47C 27/081 |
| | | | 52/235 |
| 2006/0213013 A1 * | 9/2006 | Wang | A47C 27/081 |
| | | | 5/713 |
| 2008/0104762 A1 * | 5/2008 | Davis | A61G 7/1021 |
| | | | 5/621 |
| 2009/0070941 A1 * | 3/2009 | Lau | A47C 27/001 |
| | | | 5/706 |
| 2012/0272450 A1 * | 11/2012 | Pittman | A47C 17/80 |
| | | | 5/119 |
| 2017/0096179 A1 * | 4/2017 | Wall, II | B62D 35/001 |

\* cited by examiner

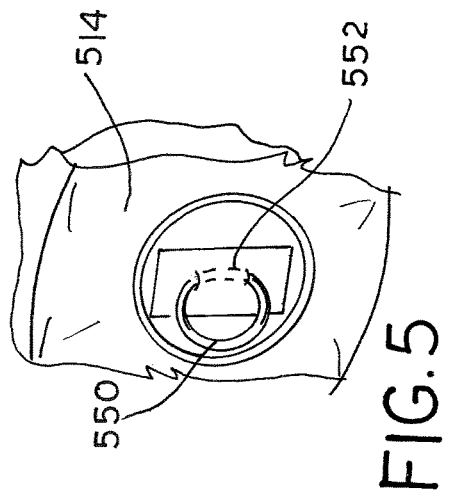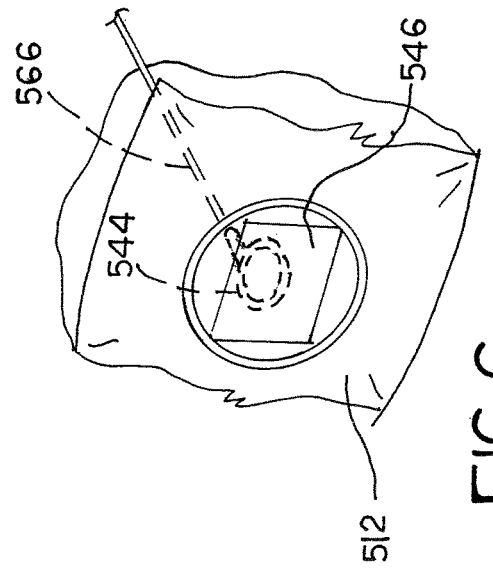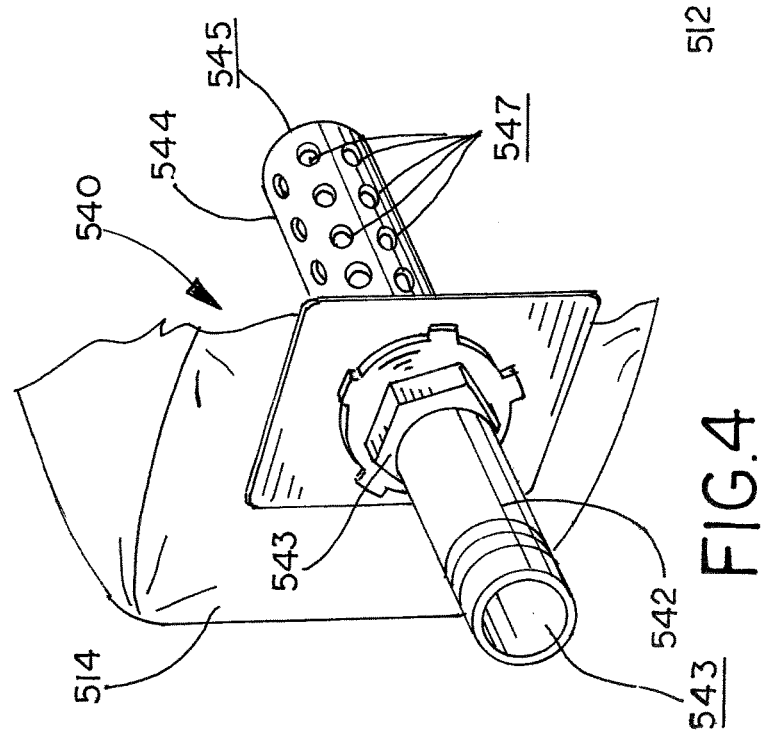

US 10,029,745 B2

INFLATABLE PANEL FOR AN AERODYNAMIC FAIRING ASSEMBLY

This application is a continuation-in-part of U.S. patent application Ser. No. 15/115,762 filed Aug. 1, 2016, that claims the benefit of PCT patent application, Ser. No. PCT/US15/034,737 filed Jun. 8, 2015, which claims the benefit of U.S. Provisional Patent Application, Ser. No. 62/009,683 filed Jun. 9, 2014, the disclosures of which are hereby incorporated by reference.

This invention relates to an aerodynamic gap fairing and drag reduction apparatus for tractor-trailers, and in particular an inflatable panel for an aerodynamic fairing assembly used on tractor-trailers.

BACKGROUND AND SUMMARY OF THE INVENTION

Aerodynamic fairing assemblies, such as the ones developed and manufactured by Wall Global, LLC. of Franklin, Tenn., use inflatable panels that automatically deploy and retract at certain speeds to cover and enclose the space between the tractor truck and connected trailers. These inflatable panels significantly improve the aerodynamics of long haul tractor-trailers, which increases fuel economy and vehicle stability. These fairing assemblies also use blowers that provide a continuous airflow to the inflatable panels during deployment to maintain the rigidity and structural integrity of the panel regardless of ambient temperature or air pressure.

As used in continuous airflow systems, such as those of Wall Global, inflatable panels require certain unique functions and features. In order to function properly in a continuous airflow system, the inflatable panels would generally require an air vent to bleed off a portion of the supplied airflow from the blower. During deployment, bleeding air through an air vent in the inflated panels creates an undesirable whistling sound. In addition, the inflatable panels must have blower connections and retraction units that help ensure that the panel deflates and retract neatly into their panel housing.

The inflatable panels of this invention are designed and intended for use as an inflatable airfoil in an aerodynamic fairing assembly that uses a blower that provides a continuous airflow to the inflated panel to maintain it in the deployed position. The inflatable panel is designed to deploy outward from separate panel housings or other support structures to vertically extend the side wall of the tractor truck forming an airfoil or side fairing wall. The inflatable panel is constructed from sheets of PVC vinyl that are cut, assembled and joined together. The major seams of the inflatable panel are sewn together rather than bonded using conventional construction methods. The sewn seams act as an air vent that allow air to bleed from the panel, thereby eliminating the need for a separate air vent to bleed off the continuous airflow from the blower and the undesired whistling associated with a conventional air vent. The inflatable panel includes a blower port with an internal vent end designed to prevent the port from becoming obstructed by the body of the panel collapsing on itself as the panel deflates. The inflatable panel also includes a retraction unit oriented so that the internal cable not only retracts the deflating panel uniformly into the panel housing but also laterally urges the panel slightly in one direction to ensure that the deflating panel does not splay outward creating a road hazard.

The above described features and advantages, as well as others, will become more readily apparent to those of ordinary skill in the art by reference to the following detailed description and accompanying drawings.

BRIEF DESCRIPTION OF THE DRAWINGS

The present invention may take form in various system and method components and arrangement of system and method components. The drawings are only for purposes of illustrating exemplary embodiments and are not to be construed as limiting the invention. The drawings illustrate the present invention, in which:

FIG. 4 is a partial perspective view of the inlet port of the inflatable panel of FIG. 1;

FIG. 5 is a partial perspective view of the retraction cable mount of the inflatable panel of FIG. 1;

FIG. 6 is a partial perspective view of the retraction cable mount of the inflatable panel of FIG. 1 with the retraction cable attached;

DESCRIPTION OF THE PREFERRED EMBODIMENT

Figure 1:
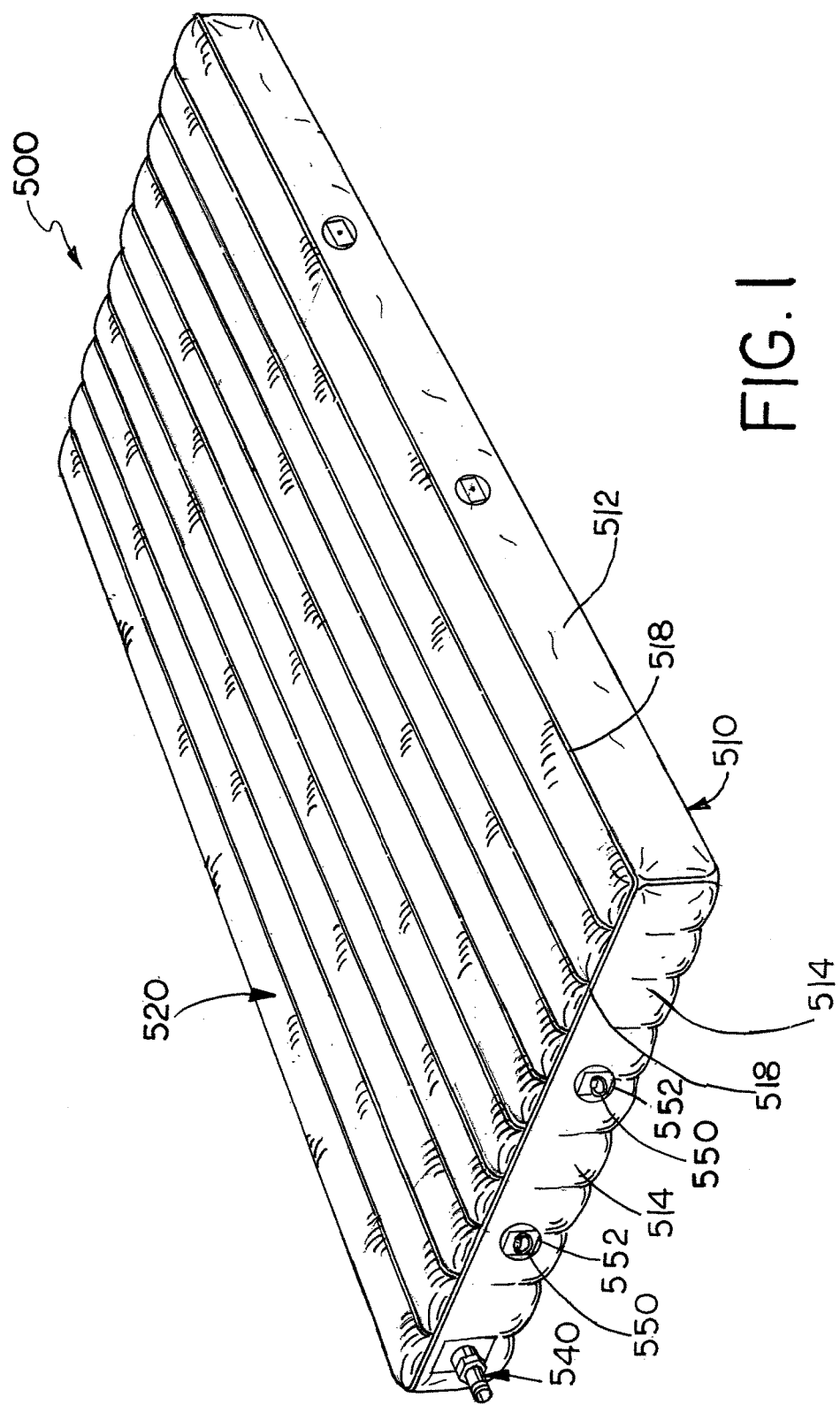
FIG. 1 is a perspective view of an exemplary embodiment of the inflatable panel for use as an aerodynamic fairing for a tractor truck.
Figure 2:
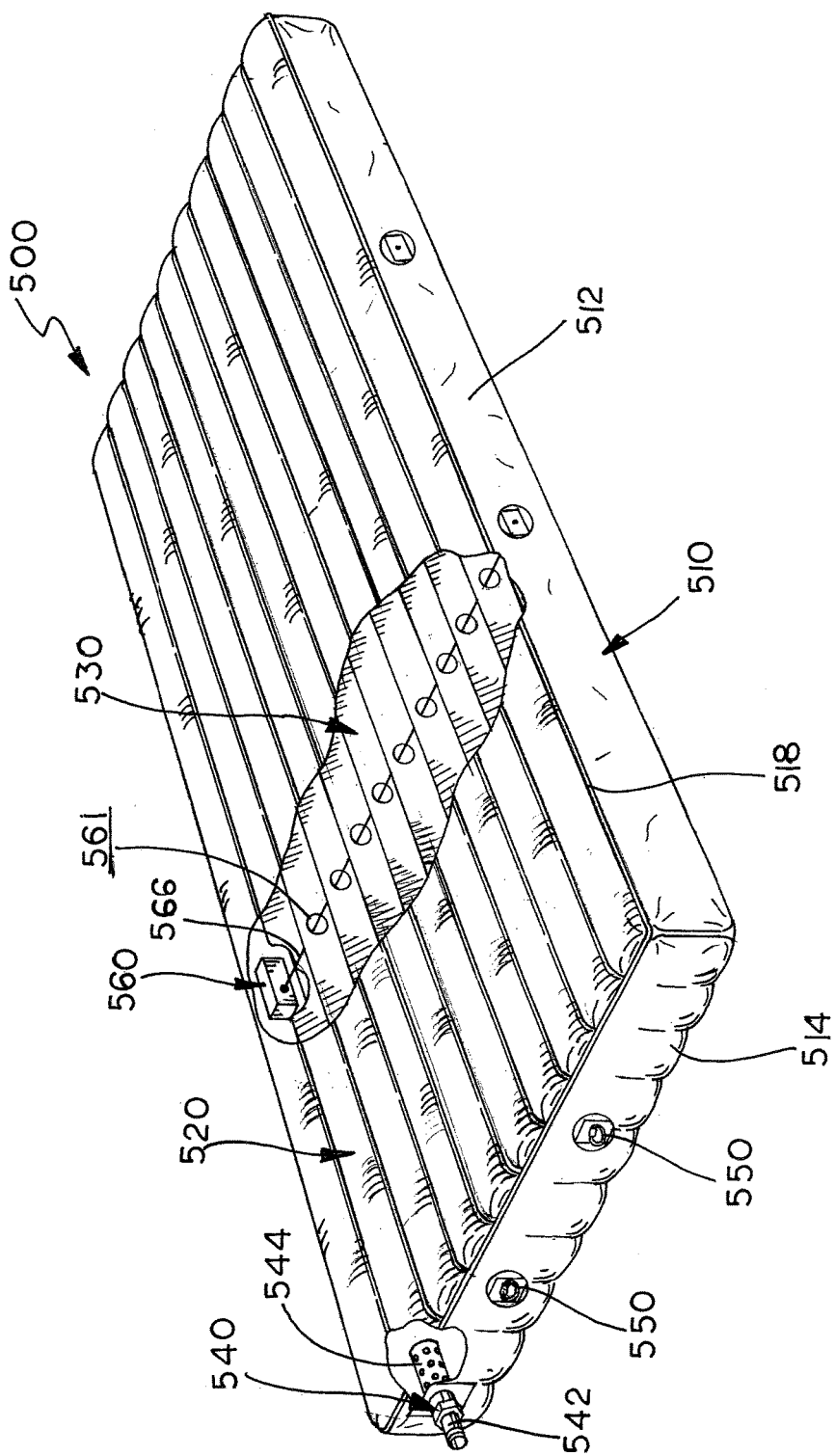
FIG. 2 is another perspective view of the inflatable panel of FIG. 1 with portions cut away to illustrated the certain internal components.

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical, structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Referring now to the drawings, FIGS. 1-9 illustrate an exemplary embodiment of the inflatable panel of this invention, which is designated generally as reference numeral 500. Inflatable panel 500 is a collapsible planar air bladder specifically designed and intended for use as an inflatable airfoil in an aerodynamic fairing assembly that uses a blower that provides a continuous airflow to the inflated panel to maintain it in the deployed position. A pair of inflatable panels 500 deploys outward from a separate panel housing (not shown) or other support structure mounted to vertically extend the side walls of the tractor truck (not shown) to form an airfoil or side fairing wall, which cover or enclose the gaps between the tractor truck and trailer (also not shown).

Figure 3:
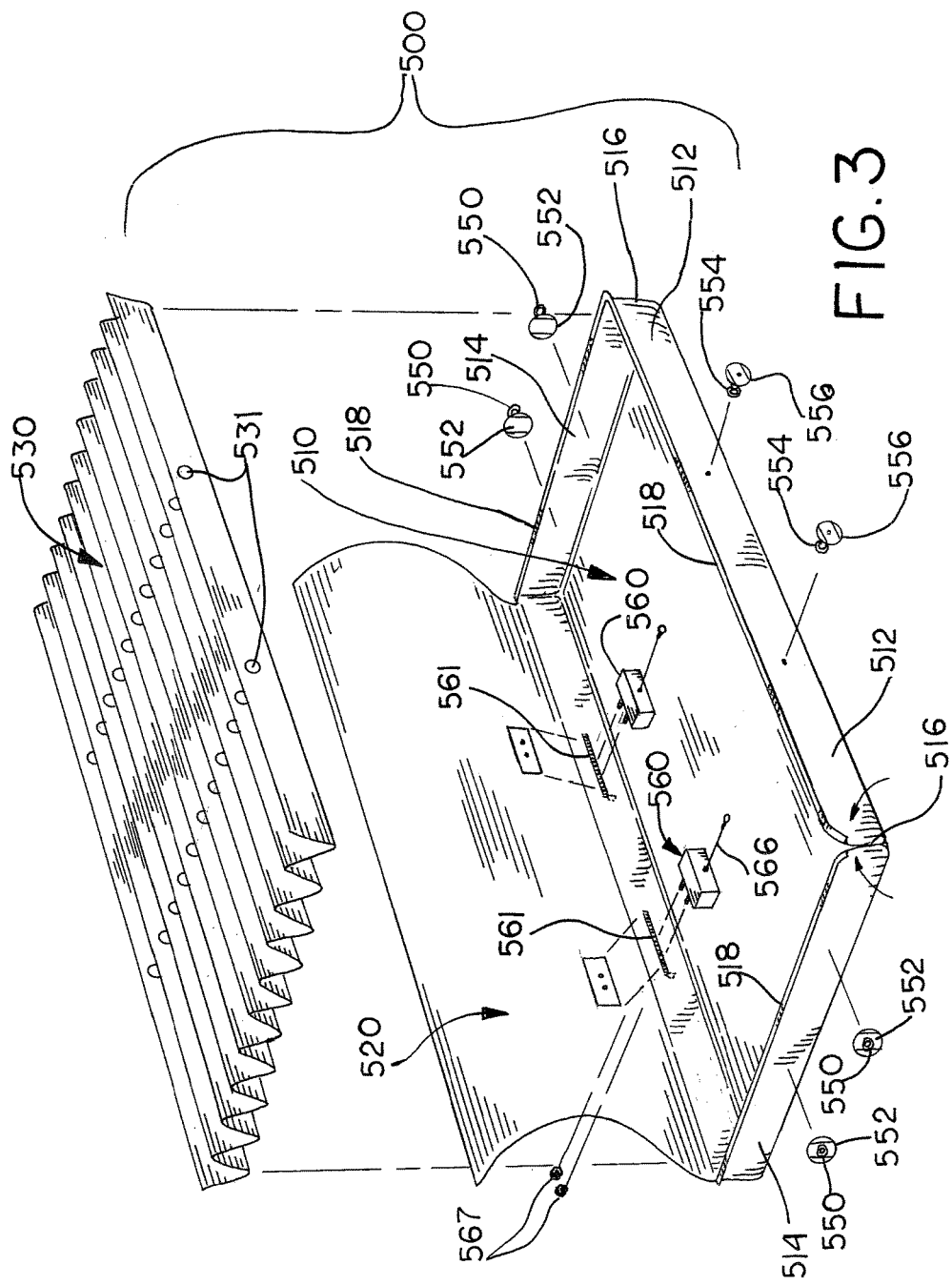
FIG. 3 is an exploded view of the inflatable panel of FIG. 1.

Inflatable panel 100 is constructed from sheets of hermetic fabric, such as PVC vinyl. PVC vinyl provides an air tight fabric that is durable, pliable and well equipped to handle adverse weather conditions and withstand great physical stress. PVC vinyl is commonly used in "bounce" or "play" houses and other inflatable structures. Sheets of PVC vinyl are cut, assembled and joined to form the rectangular body of inflatable panel 500. As shown in FIG. 3, inflatable panel 500 is generally fashioned from two main panel sheets of PVC vinyl 510 and 520, which cut, hemmed, folded and joined together to form the inflatable bladder body of panel 100. Panel sheets 510 and 520 form the large sidewalls of panel 500. The periphery of panel sheet 510 is cut and folded to form opposed panel end walls 512 and opposed top and bottom walls 514. End walls 512 and top and bottom walls are joined to form the corners of panel 500. Panel sheet 510 is also cut and shaped so that end walls 512 and top and bottom walls 514 have a hemmed edge that forms a peripheral flange 518 that extends perpendicularly therefrom. Panel sheet 520 also has a hemmed peripheral edge, which is joined to flange 518 of sheet 510. Inflatable panel 500 also includes an undulated baffle disposed within the panel interior. Baffle 530 is a sheet of PVC vinyl that is folded to form undulating longitudinal folds. Alternating edges of the baffle's longitudinal folds are joined to the inner surface of panel sheets 510 and 520.

Major seams of panel 500 where panel sheets 510, 520 and baffle 530 are sewn together rather than bonded using conventional construction methods. Conventional construction methods and techniques joining sections of inflatable structures, like "bounce" or "play" houses and other inflatable structure involve seams between joined sections of fabric welded together with heat or adhesives. The sewn seams, particularly, the peripheral seam joining the edges of panel sheets 510 and 520 and the longitudinal seams joining the undulating edges of baffle 530 to the inner surface of panel sheets 510 and 520, act as air vents that allow air to bleed from the panel 500. Consequently, the sewn seams of inflatable panel 500 eliminate the need for a separate air vent to bleed off the continuous airflow from the blower. The sewn seams allow a sufficient volume of air to escape, which allows the continuous airflow blower to keep the panel fully inflated with the desired airflow velocity and volume, without a drop in electrical or mechanical efficiency of the blower. Allowing air to escape through the sewn seams eliminates the undesirable whistling noise created by a continuous airflow through an air vent.

Inflatable panel 500 includes a blower connection port 540 mounted to its bottom end wall 514. Blower port 540 is a tubular fitting that allows an air hose (not shown) from the blower or blower/vacuum (not shown) to be readily connected to panel 500 for inflating or deflating the panel. Generally, blower port 540 is a fitting molded or formed PVC plastic. Blower port 540 is secured to bottom end wall 514 by a conventional hex nut 548, of the type used with a conventional plumbing fitting, which is turned onto a threaded portion of the coupling's body. Blower port 540 may also incorporate support flanges, gaskets and support members as necessary to provide a hermetic seal and structural integrity to the area of end wall 514 around the coupling. Blower port 540 has an external hose connection end 542 and an internal vent end 544. Hose connection end 542 is adapted to couple to the air hose from the blower or blower/vacuum and has a tubular body with a distal end opening 543. Vent end 544 has a tubular body with a distal end opening 545 and a plurality of side openings 547. The tubular body of blower port 540 allows open airflow communication through connection end 542 and vent end 544. Side vents 547 of vent end 544 allow airflow therethrough as well as through end opening 545. The plurality of side vents 547 in vent end 544 help ensure airflow through blower port 540. When panel 500 deflates to its stowed position, the fabric body of the panel may collapse on itself and obstruct air flow into end opening 545 of blower port 540. Side vents 547 allow airflow into blower port 540 should end opening 545 or some portion of the side vents 547 be obstructed, ensuring that panel 500 can fully deflate.

As shown in FIG. 5, inflatable panel 500 includes a plurality of metal D-rings 550 mounted to the top and bottom of end walls 514. D-rings 550 are used to affix panel 500 to the panel housing (not shown). D-ring 550 is affixed to end wall 514 by a patch 552 of PCV vinyl or rubber bonded to the end wall by an adhesive or heat welded to the end wall. These D-rings may be similarly mounted to the exterior surface of panel 500 to be used as attachment points for various purposes including the attachment of other fairing assemblies or tractor truck components or accessories.

Figure 7:
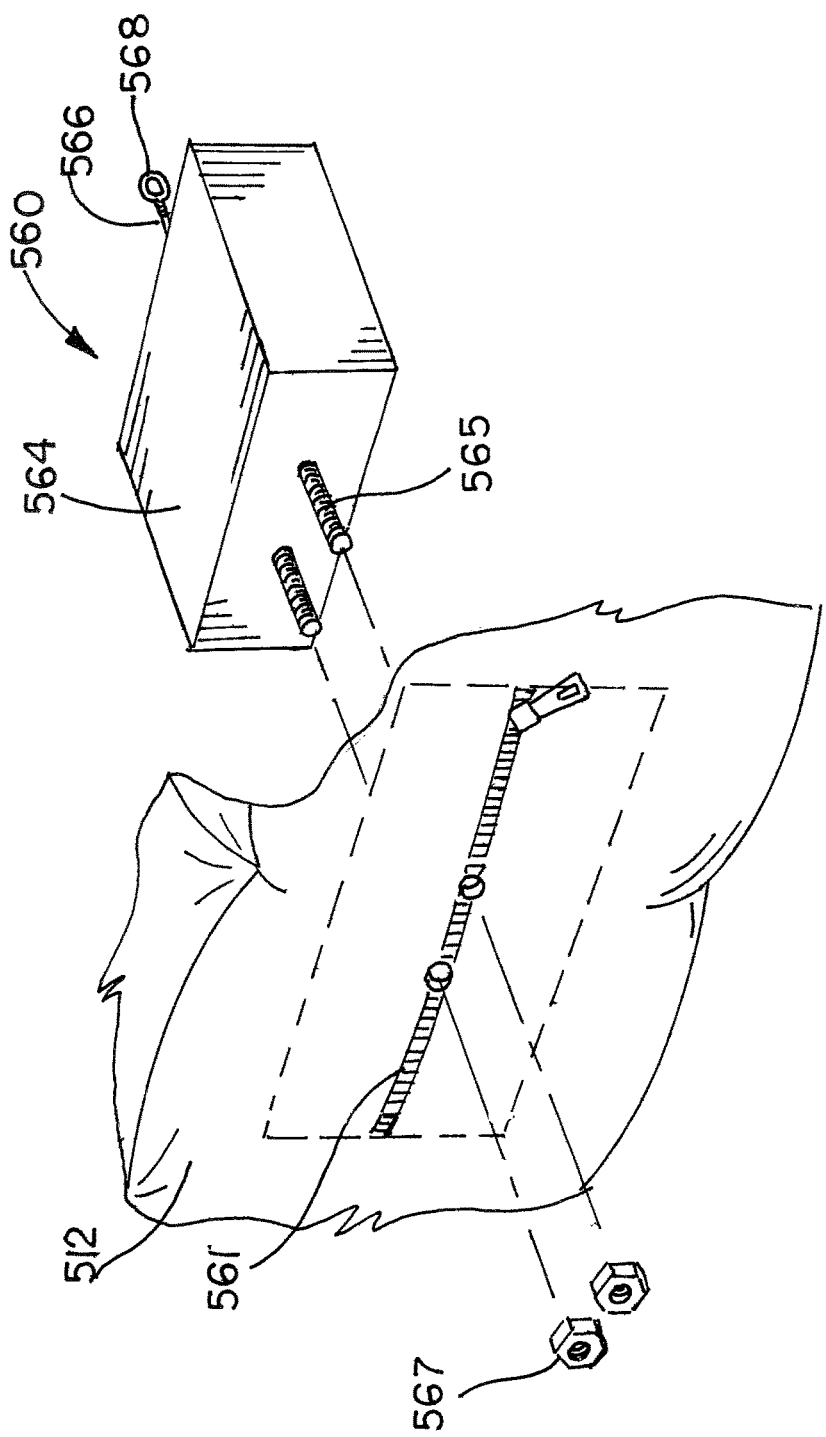
FIG. 7 is a partial perspective view of the zippered closure and retraction unit of the inflatable panel of FIG. 1.
Figure 8:
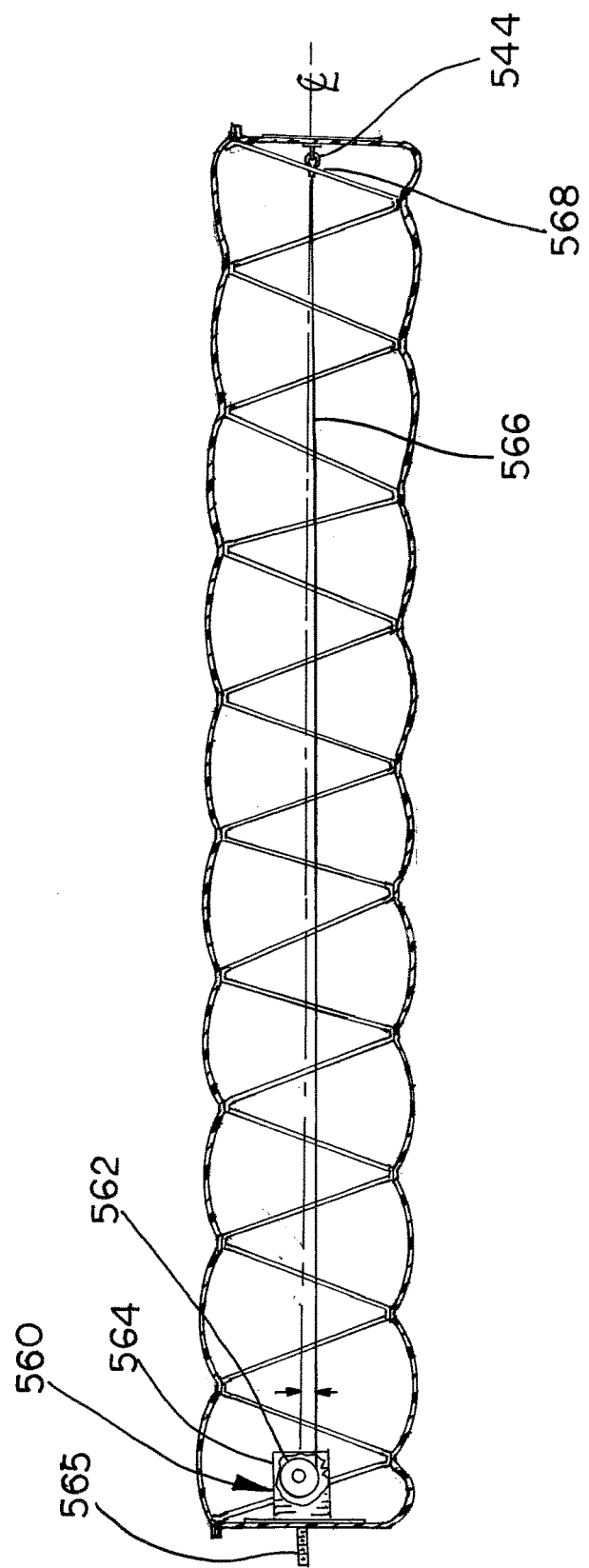
FIG. 8 is a sectional view of the inflatable panel of FIG. 1 showing the retraction unit.
Figure 9:
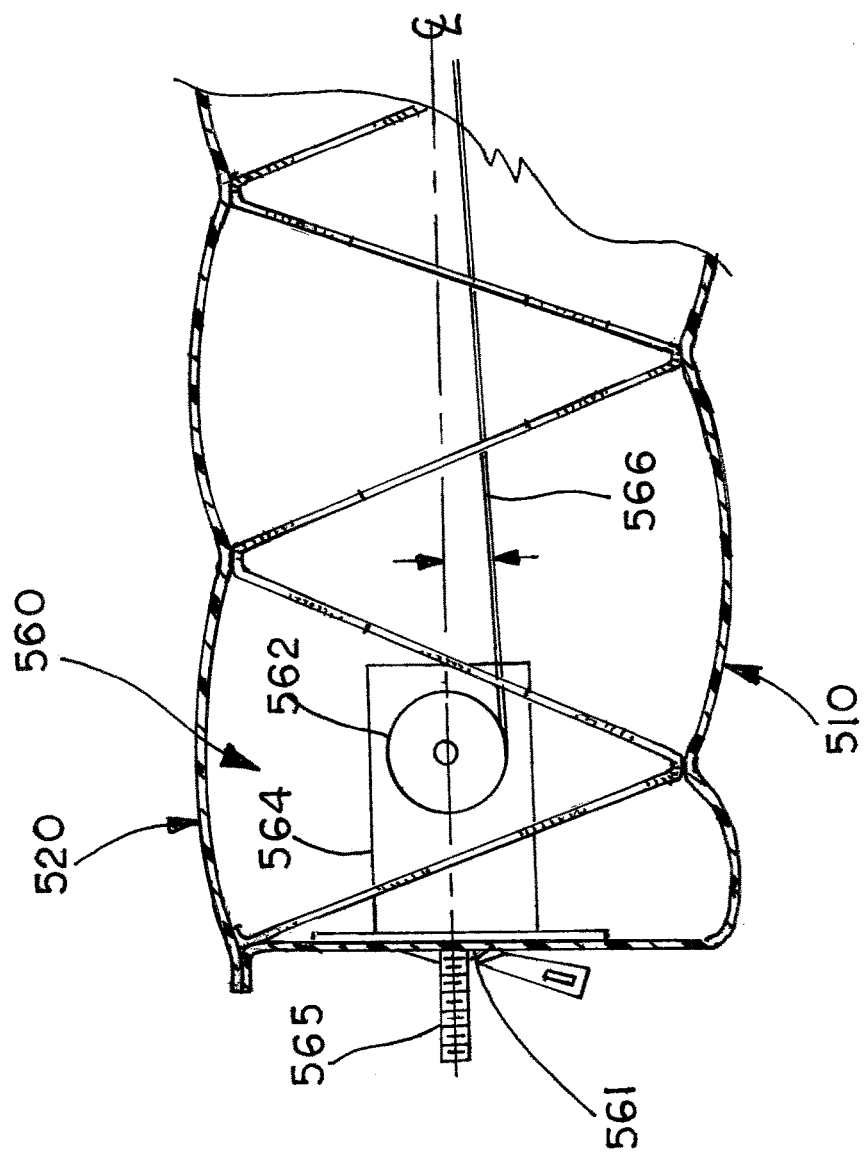
FIG. 9 is a partial sectional view of the inflatable panel of FIG. 1.

As shown in FIGS. 6-9, inflatable wall panel 500 includes a pair of cable retraction units 560, which assist in retracting the wall panels into the panel housing (not shown) when deflated. Retraction cable units 560 are disposed within the interior of inflatable panels 500 themselves. Retraction cable unit 560 includes a spring loaded spool 562 enclosed in its own cable housing 564 and a length of wire cable 566 wound around the spool. Each retraction unit 560 is accessed through a zippered slot 561 in one of sidewall 512. In alternative embodiments, the retraction units may be accessed through flaps secured to the sidewalls by hook and loop fasteners or other means. Each retraction unit 560 is affixed through the sidewall to the panel housing (not shown) by a pair of threaded mounting studs 565 and hex nuts 567 or other fasteners (FIG. 7). The end of wire cables 566 extend through aligned openings 631 in the folds of baffle 530 and terminate in a cable connector 568, which secures the cable to a pair of internal D-rings 554 mounted to the inside of sidewall 512 (FIG. 6).

It should be noted that inflatable panels 500 generally inflate and deploy in an upright or vertical orientation to act as a side airfoil or side fairing. As such, retraction units 560 are mounted to panel 500 such that the rotational axis of spool 562 lies in the longitudinal (vertical) plane (depicted as centerline CL in top views of FIGS. 8 and 9) of the inflated panel 500. Cable 566 winds tangentially onto cylindrical body of spool 562 at an angle offset laterally from centerline CL. The cable tension and the offset angle at which the cable is wound around the spool creates a slight lateral force which urges the distal end of panel 500 laterally in one direction when deflating and retracting back into the panel housing. Consequently, inflatable panels can be configured as either a left of right sided airfoil where the lateral force created by the orientation of the cable winding helps draw the panel to one side (usually inward) as it deflates and retracts into the panel housing. This feature helps ensure that the panels deflate and retract uniformly and that the panel does not splay outward as it deflates creating a safety hazard for other vehicles.

It should be apparent from the foregoing that an invention having significant advantages has been provided. While the invention is shown in only a few of its forms, it is not just limited but is susceptible to various changes and modifications without departing from the spirit thereof. The embodiment of the present invention herein described and illustrated is not intended to be exhaustive or to limit the invention to the precise form disclosed. It is presented to explain the invention so that others skilled in the art might utilize its teachings. The embodiment of the present invention may be modified within the scope of the following claims.

I claim:

1. An improvement in an inflatable panel for use in aerodynamic fairing assembly for a tractor-trailer having a blower operatively connected to the panel to provide a continuous airflow into the panel that keep the panel inflated, the improvement comprises the inflatable panel having a panel body constructed of a first sheet of pliable hermetic material and a second sheet of pliable hermetic material overlying the first sheet and sewn together forming a sewn peripheral seams that act as an air vent to bleed air from the panel body when the inflated panel is inflated.

2. The improvement of claim 1 wherein the panel body also having a baffle disposed within the panel body, the baffle folded to form a plurality of undulating folds sewn between the first sheet and the second sheet forming a plurality of sewn baffle seams that also act as an air vent to bleed air from the panel body when the inflatable panel is inflated.

3. The improvement of claim 1 wherein the panel body includes a port fitted to the panel body and adapted to operatively connect to the blower to allow airflow into and out of the panel body, the port having a tubular port body terminating in a first port end extending externally from the panel body and a second port end disposed within the panel body, the second port end having a plurality of lateral openings formed therein.

4. The improvement of claim 1 wherein the panel body has a generally planar shape and includes a pair of opposed panel end walls, the panel body also has an interior defined therein.

5. The improvement of claim 4 wherein the inflatable panel is inflatable to a deployed position to act as an aerodynamic fairing and is deflatable to a stowed position, the inflatable panel further includes a retraction unit disposed within the panel body interior for collapsing the panel body as the inflatable panel deflates from the deployed position to the stowed position, the retraction unit includes a spool housing connected to one of the opposed panel end walls, a tensioned spool rotatably disposed within the spool housing and a cable wound about the spool and having a cable end retractably extending from the spool housing and affixed to the other of the opposed panel end walls.

6. The Improvement of claim 5 wherein the spool rotates about an axis that lies in the central longitudinal plane of the panel body such that the cable extends through the panel body interior at an angle with respect to central longitudinal plane of the panel body.

7. The improvement of claim 6 wherein the spool is tensioned to exert a force on the cable which winds the cable onto the spool and generates a lateral force through the cable on the inflatable panel to laterally deflect the panel body as the inflatable panel deflates to the stowed position.

* * * * *